United States Patent [19]

Nastrucci

[11] Patent Number: 5,570,614
[45] Date of Patent: Nov. 5, 1996

[54] ADJUSTABLE BICYCLE HANDLEBAR MOUNTING ASSEMBLY

[76] Inventor: Gianfranco Nastrucci, 21, contrada Meneghetti, Bassano del Grappa 36061, Italy

[21] Appl. No.: 444,772

[22] Filed: May 19, 1995

[30] Foreign Application Priority Data

May 25, 1994 [IT] Italy ................... P494A0097
Jan. 13, 1995 [IT] Italy ................... PD95A0007

[51] Int. Cl.⁶ ................................. B62K 21/12
[52] U.S. Cl. ................ 74/551.1; 74/551.8; 280/279
[58] Field of Search ................ 74/551.1–551.8; 280/279

[56] References Cited

U.S. PATENT DOCUMENTS

| | | | |
|---|---|---|---|
| 567,663 | 9/1896 | Snyder | 74/551.1 |
| 1,263,249 | 4/1918 | Hoppes | 74/551.1 |
| 1,987,404 | 1/1935 | Korte | 74/551.1 |
| 2,180,617 | 11/1939 | Snell | 74/551.1 |
| 4,930,738 | 6/1990 | Yamazaki et al. | 74/551.8 X |
| 5,154,095 | 10/1992 | Giard | 74/551.8 |
| 5,209,506 | 5/1993 | Klopfenstein | 74/551.1 X |

FOREIGN PATENT DOCUMENTS

| | | | |
|---|---|---|---|
| 363466 | 8/1906 | France | 74/551.1 |
| 961924 | 5/1950 | France | 74/551.1 |
| 23573 | of 1901 | United Kingdom | 74/551.1 |
| 17727 | of 1909 | United Kingdom | 74/551.1 |

*Primary Examiner*—Vinh T. Luong
*Attorney, Agent, or Firm*—Dowell & Dowell

[57] ABSTRACT

An adjustable bicycle handlebar mounting assembly comprises stem including a portion for mounting to the stem tube of a bicycle and two parallel jaws for receiving tubular elements. The jaws are adjustable to enable the tubular elements to selectively positioned in the length direction of the bicycle. A handlebar mounting element for use with the stem comprises two parallel bores which are mountable to the tubular elements, and a jaw orthogonal to the two parallel bores for housing a handlebar. The handlebar is adjustable in the width direction of the bicycle. A clamping element comprises seats for housing two half-handlebars, and a fastening element. The clamping element enables the half-handlebar position to be adjusted relative to the stem, while maintaining the half-handlebars fixed with respect to each other.

12 Claims, 4 Drawing Sheets

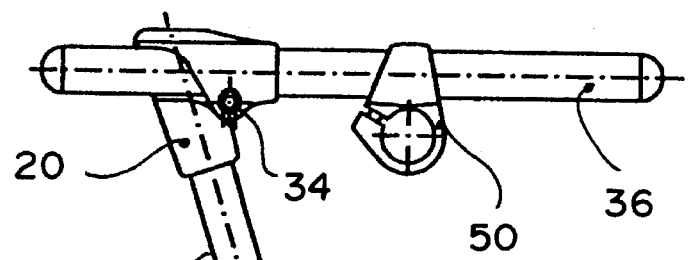
FIG. 7a
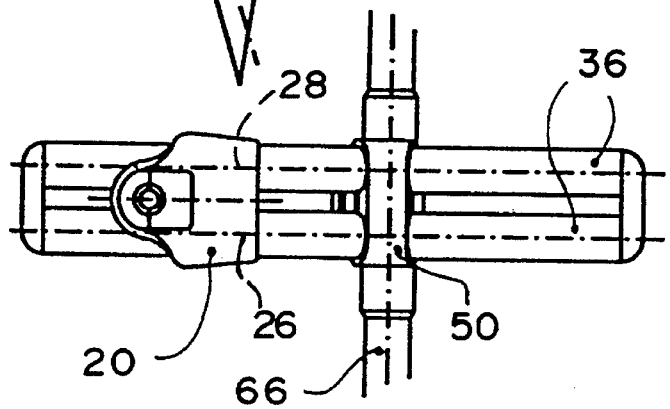
FIG. 7b
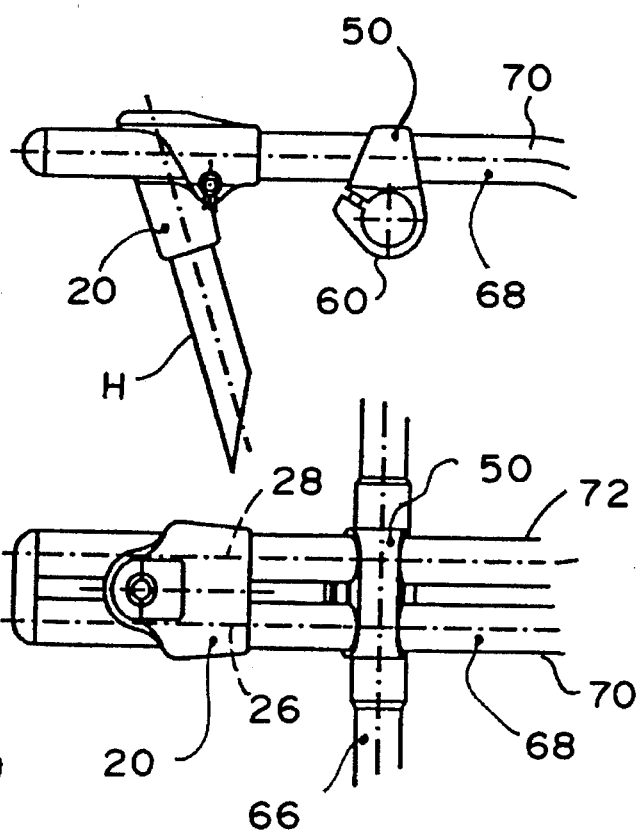
FIG. 8a
FIG. 8b

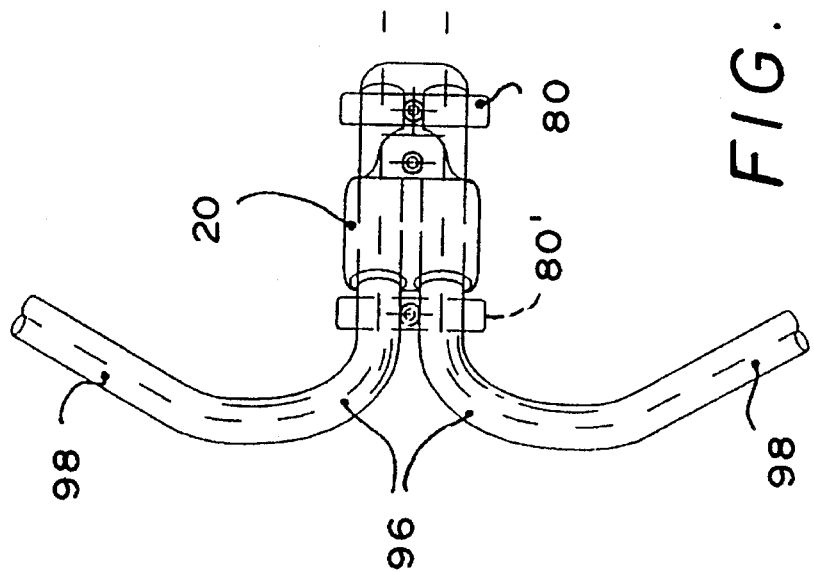
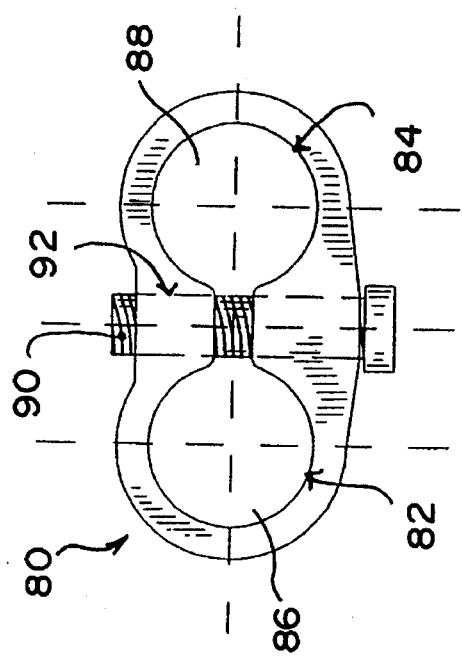
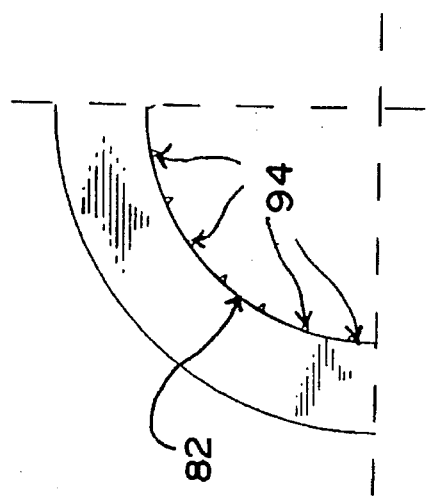

ADJUSTABLE BICYCLE HANDLEBAR MOUNTING ASSEMBLY

BACKGROUND

This invention concerns bicycles and, in particular, handlebar stems.

The known kinds of handlebar stems join traditional handlebars (one-piece, linear, horizontal but transverse with reference to the direction of movement) to the fork and wheel. These stems allow the handlebars to rotate, but do not allow them to translate in the direction of movement in such a way as to make it possible to adjust the distance of the handlebar center from the saddle.

There are attachments which can be installed on the central part of known handlebars. These attachments extend towards the direction of movement and allow the cyclist to rest his elbows on the traditional handlebars and to keep his hands on grips positioned on the front end of the attachment itself. Handlebars are known which consist of two pieces of tube having the central part, that is, the part near the front fork tube, placed longitudinally, that is, parallel to the direction of movement of the bicycle.

In order to use the above mentioned attachments it is necessary to apply either fasteners or clamps or jaws to the traditional handlebars to connect the attachments in two parts to the traditional handlebars.

There are neither stems, nor jaws, nor other devices that make it possible to use the attachments independently of the traditional handlebars.

SUMMARY

To eliminate these drawbacks a new kind of handlebar mounting assembly has been designed and implemented, which allows one to adjust the distance of traditional handlebars from the saddle and to install attachments on the bicycle independently of the presence, and of the type, of the traditional handlebars.

The new mounting assembly is comprised of a stem and an element with three jaws.

One of the sections of the stem is provided with a first seat in which the fork tube is housed; the other section of the stem is larger and has two seats or parallel jaws placed side by side in the direction of movement of the bicycle.

The two seats or jaws of the stem are tightened by means of two independent screws or with a single screw which acts on the two jaws at the same time; the seats or jaws house an attachment or two simple pieces of tube to hold them.

The three-jaw element can be fastened to the parallel linear sections of the attachment or to the two pieces of tube housed in the parallel jaws of the stem. Two of its jaws, in fact, are parallel and spaced from each other like the parallel jaws of the stem. The third jaw is horizontal and orthogonal to the other two jaws and houses the traditional handlebars.

The stem is provided with a lower tube which is housed in the stem tube like a normal handlebar stem arranged so that the axes of the jaws extend in the direction of movement of the bicycle.

Either the attachment for a different riding posture or two simple pieces of tube connected with each other at their ends are housed on the stem.

The three-jaw element is suitable for supporting any type of handlebars and is installed on the linear sections of the tubes that make up the attachments or the simple pieces of tube.

The stem in accordance with the invention makes it possible to adapt the position of the handlebars according to the cyclist's needs. The stem can be raised or lowered by loosening the stem fastening screw which acts on the fork tube and by raising or lowering the whole stem, finally re-tightening the fastening screw. To move the grips forward or backward it is sufficient to loosen the fastening screw or screws of the parallel jaws of the stem, to put the handlebars in the desired position and to retighten the screw or screws of the jaws.

Similarly, it is possible to loosen the screw which tightens the two parallel jaws in the three-jaw element, in such a way as to be able to adjust the position of the traditional handlebars relative to the attachment and to the fork.

Further, it is possible to move the two separate grips at the same time, in such a way as to make them advance and go back keeping their relative position and, therefore their distance from the ground, constant. This result is achieved by means of a clamp tightened in a single point and shaped so that it can receive both half-grips.

The clamp comprises a single metal block provided with two seats in which the two half-grips of the handlebars are inserted.

The central part of the clamp is provided with a special seat which houses a fastening screw suitable for locking the two half-handlebars.

The two seats where the two half-handlebars are inserted are semi-circular and are provided with a series of teeth formed on their inner surface to ensure safe locking concentrated in precise areas.

The clamp can be inserted either in the front or in the rear of the stem for the two half-handlebars, according to their distance from the cyclist.

The following is just an example among many of the practical applications of the invention [in question, described in the attached tables].

BRIEF DESCRIPTION OF THE DRAWINGS

In the accompanying drawings:

FIG. 7a is a side view illustrating an example application of the stem of FIG. 1 and the connecting element of FIG. 4;

FIG. 7b is a top plan view of the example application illustrated in FIG. 7a;

FIG. 8a is a side view illustrating another example application of the stem of FIG. 1 and the connecting element of FIG. 4;

FIG. 8b is a top plan view of the example application of FIG. 8a;

FIG. 9 is an end view of a clamp in accordance with the invention;

FIG. 10 is an enlarged partial view of one of the seats of the clamp of FIG. 9; and FIG. 11 is a top plan illustrational view of an example application of the stem of FIG. 1 and the clamp of FIG. 10 with an alternate position of the clamp represented in broken line.

DETAILED DESCRIPTION

Figure 1:
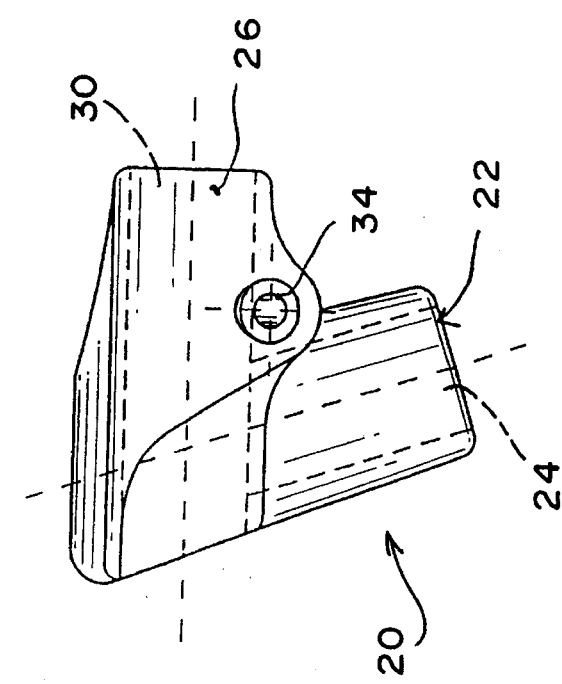
FIG. 1 is an end view partially in cross section of a stem in accordance with the invention.
Figure 2:
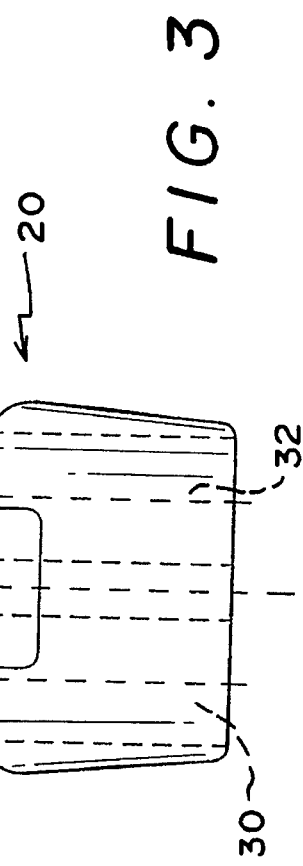
FIG. 2 is a side view of the stem of FIG. 1.
Figure 3:
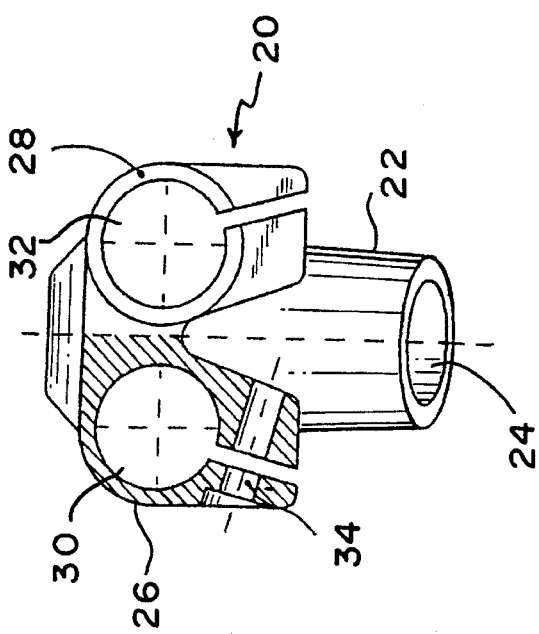
FIG. 3 is a top plan view of the stem of FIG. 1.

FIGS. 1, 2, 3 show three views of a stem 20 which includes a seat 22 defining a bore 24 for the connection with a head tube H as shown in FIG. 7a, two jaws 26, 28 having bores 30, 32, respectively, with fastening screws 34 (only one shown) to house either attachment tubes 36 (FIG. 7b) or handlebars in two parts. As shown in FIG. 3, a fastener 38 is provided in the stem 20.

Figure 5:
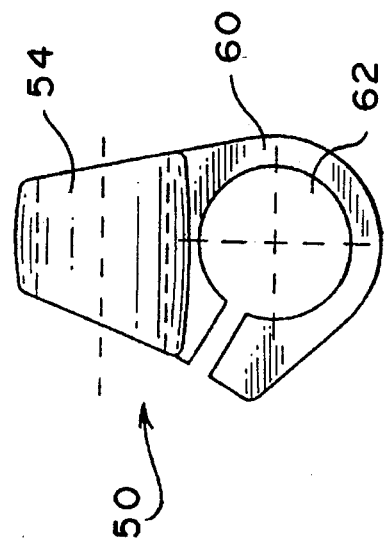
FIG. 5 is a side view of the connecting element of FIG. 4.
Figure 4:
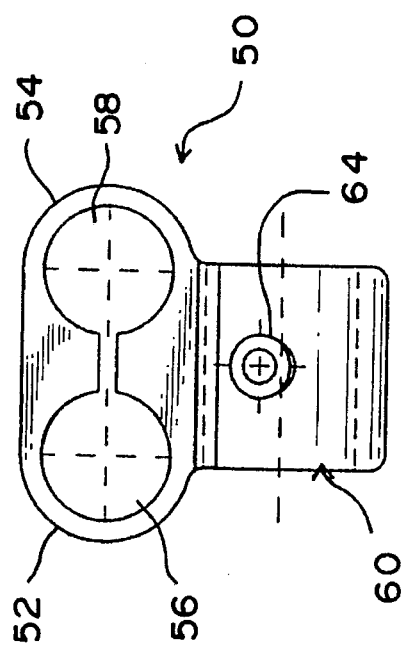
FIG. 4 is an end view of a connecting element in accordance with the invention.
Figure 6:
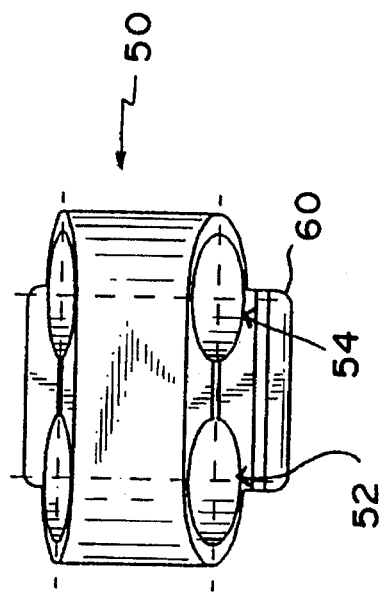
FIG. 6 is a top plan view of the connecting element of FIG. 4.

FIGS. 4, 5, 6 show three views of a connecting element 50 with three jaws; namely, two jaws 52, 54 of which are parallel and suitable for installation on the linear sections of the attachment tubes 36 (FIG. 7b) or of the handlebars in two parts, and a third jaw 60 suitable for installation on traditional handlebars. The jaws 52, 54 define bores 56, 58, respectively, and the jaw 60 defines a bore 62. A fastener 64 is provided on the jaw 60.

FIGS. 7a, 7b, 8a and 8b show three different applications of the handlebar stem in accordance with the invention.

In FIGS. 7a and 7b, the angular element 20 holds two pieces of tube 36 on which the three-jaw element 50 supporting the traditional handlebars 66 is installed.

In FIGS. 8a and 8b, the stem holds an attachment 68 including two tubular parts 70, 72 for a different riding posture, on the linear sections of which the three-jaw element 50 supporting the traditional handlebars 66 is applied. The tubular parts 70, 72 are housed in the jaws 26, 28 of the stem 20.

FIG. 9 shows a one-piece clamp 80 in accordance with the invention provided with two seats 82, 84, defining respective bores 86, 88, in which two half-handlebars are introduced, which are spaced from each other by means of a fastening screw 90 inserted in a through hole 92.

FIG. 10 shows one fourth of the section of seat 82, for example, of the two seats 82, 84 provided on its inner surface with small prongs 94 which concentrate the tightening strength of the screw 90 on precise points of the half-handlebars.

FIG. 11 shows the two half-handlebars 96 inserted in a stem 20 and connected to each other by means of the clamp 80, which can be positioned either at the front at 80' or at the rear of the stem at 80, according to the distance between the half-handlebars 96 and the stem 20. The clamp 80, therefore, makes it possible to move the two half-handlebars 96 simultaneously, without changing the inclination of the grips 98.

The above are the basic outlines of the invention, on the basis of which the technician will be able to provide for implementation; therefore, upon implementation certain variants may be present, without any negative effect upon the basic innovation. With reference to the above description and the attached drawings, the following claims are put forth.

I claim:

1. A handlebar mounting assembly suitable for mounting handlebars to a bicycle including an upstanding stem tube, comprising:

a unitary stem including a downwardly extending portion for mounting to the stem tube of the bicycle, first and second jaws defining respective first and second parallel bores extending through said stem, the first and second bores each sized to receive one of a pair of tubular members, the first and second bores being adapted to extend in the length direction of the bicycle when said stem is mounted to the stem tube, and means for adjusting the first and second jaws to enable the pair of tubular members to be adjustably positioned with respect to said stem; and a handlebar mounting element for mounting to the pair of tubular members forwardly of said stem, the handlebar mounting element defining third and fourth parallel bores each sized to receive one of the pair of tubular members, and a third jaw defining a bore orthogonal to the third and fourth bores for receiving a handlebar, said third jaw being adjustable to enable the handlebar to be adjustably positioned relative to the width of the bicycle.

2. The handlebar mounting assembly of claim 1, wherein the adjusting means comprises fastening means for simultaneously adjusting the first and second jaws of said stem.

3. The handlebar mounting assembly of claim 1, wherein the adjusting means comprises fastening means for independently adjusting the first and second jaws of said stem.

4. A handlebar mounting assembly suitable for mounting handlebars to a bicycle including an upstanding stem tube, comprising:

a unitary stem including a downwardly extending portion for mounting to the stem tube of the bicycle, first and second jaws defining respective first and second parallel bores extending through said stem, the first and second bores being adapted to extend in the length direction of the bicycle when said stem is mounted to the stem tube, and means for adjusting the first and second jaws;

first and second tubular members each sized to be selectively received in one of the first and second bores of said stem, the first and second jaws being adjustable to enable the first and second tubular members to be adjustably positioned with respect to said stem in the length direction of the bicycle; and a handlebar mounting element for mounting to the first and second tubular members forwardly of said stem, the handlebar mounting element defining third and fourth parallel bores each sized to receive one of the first and second tubular members, and a third jaw defining a bore orthogonal to the third and fourth bores for receiving a handlebar, said third jaw being adjustable to enable the handlebar to be adjustably positioned in the width direction of the bicycle.

5. The handlebar mounting assembly of claim 4, wherein the adjusting means comprises fastening means for simultaneously adjusting the first and second jaws of said stem.

6. The handlebar mounting assembly of claim 4, wherein the adjusting means comprises fastening means for independently adjusting the first and second jaws of said stem.

7. The handlebar mounting assembly of claim 4, wherein the first and second tubular members comprise first and second handlebar portions, the first and second handlebar portions each including a linear portion and a curved portion, the linear portions being selectively receivable in one of the first and second bores of said stem and in one of the third and fourth bores of said handlebar mounting element.

8. The handlebar mounting assembly of claim 4, wherein the first and second tubular members comprise first and second linear tubes, the first and second tubes being selectively receivable in one of the first and second bores of said stem and in one of the third and fourth bores of said handlebar mounting element.

9. A handlebar mounting assembly suitable for mounting handlebars to a bicycle including an upstanding stem tube, comprising:

a unitary stem including a downwardly extending portion for mounting to the stem tube of the bicycle, first and second jaws defining respective first and second parallel bores extending through said stem, the first and second bores each sized to receive one of a pair of handlebar portions, the first and second bores being adapted to extend in the length direction of the bicycle when said stem is mounted to the stem tube, and means for adjusting the first and second jaws to enable the handlebar portions to be adjustably positioned with respect to said stem; and a clamping element for mounting to the handlebar portions at a spaced location from said stem, said clamping element defining third and fourth parallel bores each sized to selectively receive one of the handlebar portions, and fastening means for adjusting the size of the third and fourth bores so as to fix the handlebar portions with respect to each other.

10. The handlebar mounting assembly of claim 9, wherein the adjusting means comprises fastening means for simultaneously adjusting the first and second jaws of said stem.

11. The handlebar mounting assembly of claim 9, wherein the adjusting means comprises fastening means for independently adjusting the first and second jaws of said stem.

12. The handlebar mounting assembly of claim 9, wherein said clamping element includes a plurality of radially, inwardly extending protrusions in each of the first and second bores thereof for engaging the pair of handlebar portions.

* * * * *